US012417506B2

(12) United States Patent
Subrahmanian et al.

(10) Patent No.: US 12,417,506 B2
(45) Date of Patent: Sep. 16, 2025

(54) GENERATING FAKE DOCUMENTS USING WORD EMBEDDINGS TO DETER INTELLECTUAL PROPERTY THEFT

(71) Applicant: Trustees of Dartmouth College, Hanover, NH (US)

(72) Inventors: Venkatramanan Subrahmanian, Evanston, IL (US); Dongkai Chen, Mountain View, CA (US); Haipeng Chen, Williamsburg, VA (US); Deepti Poluru, Hanover, NH (US); Almas Abdibayev, Hanover, NH (US)

(73) Assignee: Trustees of Dartmouth College, Hanover, NH (US)

( * ) Notice: Subject to any disclaimer, the term of this patent is extended or adjusted under 35 U.S.C. 154(b) by 127 days.

(21) Appl. No.: 18/270,690

(22) PCT Filed: Dec. 27, 2021

(86) PCT No.: PCT/US2021/065209
§ 371 (c)(1),
(2) Date: Jun. 30, 2023

(87) PCT Pub. No.: WO2022/146921
PCT Pub. Date: Jul. 7, 2022

(65) Prior Publication Data
US 2024/0095856 A1 Mar. 21, 2024

Related U.S. Application Data

(60) Provisional application No. 63/133,358, filed on Jan. 3, 2021.

(51) Int. Cl.
*G06Q 50/18* (2012.01)
*G06F 16/355* (2025.01)
(Continued)

(52) U.S. Cl.
CPC ......... *G06Q 50/184* (2013.01); *G06F 16/355* (2019.01); *G06F 18/22* (2023.01); *G06F 40/166* (2020.01); *G06F 40/40* (2020.01)

(58) Field of Classification Search
None
See application file for complete search history.

(56) References Cited

U.S. PATENT DOCUMENTS

| 10,339,423 B1 | 7/2019 | Dinerstein et al. |
| 10,657,259 B2 * | 5/2020 | Lee .................. G06N 5/041 |

(Continued)

FOREIGN PATENT DOCUMENTS

| CA | 3021168 A1 * | 7/2019 | ............ G06F 21/55 |
| WO | WO-2012075336 A1 * | 6/2012 | ............ G06F 21/56 |

OTHER PUBLICATIONS

Bollegala et al., "Joint Word Representation Learning Using a Corpus and a Semantic Lexicon," Proceedings of the Thirtieth AAAI Conference on Artificial Intelligence, 2016, available at: <https://cdn.aaai.org/ojs/10340/10340-13-13868-1-2-20201228.pdf> (Year : 2016).*

(Continued)

*Primary Examiner* — Richard W. Crandall
(74) *Attorney, Agent, or Firm* — Shackelford, McKinley & Norton, LLP (57) ABSTRACT

A computer-implemented method, system and computer program product for generating fake documents. A corpus of domain specific documents is built and word embeddings for each word in such documents are identified as embedding vectors. Concepts in the corpus are then clustered together by clustering the embedding vectors. A feasible candidate replacement set is generated for each concept using the clustered concepts in the corpus. After such pre-processing steps are accomplished, concepts are extracted from a document. The concept importance values are computed for these (Continued)

extracted concepts, in which the extracted concepts are clustered into bins based on such measurements. A joint optimization problem is solved to identify both the concepts in the document to be replaced using the clustered concepts in the bins as well as the corresponding replacement concepts obtained from the clustered concepts in the corpus. Such replacements are made to generate a fake document.

30 Claims, 5 Drawing Sheets

(51) Int. Cl.
    *G06F 18/22*    (2023.01)
    *G06F 40/166*    (2020.01)
    *G06F 40/40*    (2020.01)

(56) References Cited

U.S. PATENT DOCUMENTS

| 2017/0132866 A1 | 5/2017 | Kuklinski et al. |
| 2018/0033020 A1 | 2/2018 | Viens et al. |
| 2021/0065355 A1 | 3/2021 | Atzmon et al. |

OTHER PUBLICATIONS

International Search Report and Written Opinion for PCT/US2021/065209, mailed on Mar. 24, 2022.
Abdibayev et al. "Using Word Embeddings to Deter Intellectual Property Theft through Automated Generation of Fake Documents." ACM Trans. Manage. Inf. Syst. 12, 2, Article 13 [online], pp. 1-22, Jan. 2021.

* cited by examiner

GENERATING FAKE DOCUMENTS USING WORD EMBEDDINGS TO DETER INTELLECTUAL PROPERTY THEFT

CROSS REFERENCE TO RELATED APPLICATIONS

This application claims priority to U.S. Provisional Patent Application Ser. No. 63/133,358 entitled "Generating Fake Documents Using Word Embeddings to Deter Intellectual Property Theft," filed on Jan. 3, 2021, which is incorporated by reference herein in their entirety.

GOVERNMENT INTERESTS

This invention was made with government support under Grant No. N00014-18-1-267 awarded by the U.S. Department of Defense. The U.S. government has certain rights in the invention.

TECHNICAL FIELD

The present invention relates generally to cybersecurity systems, and more particularly to generating fake documents using word embeddings to deter intellectual property theft.

BACKGROUND

Cybersecurity or information technology security (IT security) involves the protection of computer systems and networks from the theft of or damage to electronic data. Such theft of electronic data, such as electronic documents, is part of the growing problem of intellectual property theft.

Intellectual property theft is a growing problem for the United States. According to a 2019 report, it alleges that 1 in 5 U.S. companies feel that their intellectual property has been stolen. Regardless of whether these allegations are true or not, it is clear that intellectual property theft is viewed as a major problem by U.S. corporations. The problem is even more severe because results from cybersecurity firm Symantec® state that there is a gap of 312 days on average from the time an enterprise is compromised by a zero-day attack and the time the compromise is discovered. As a result, the adversary may have almost a full year to extract valuable intellectual property without the targeted enterprise knowing.

Consequently, cybersecurity systems have been developed in an attempt to deter such intellectual property theft. One manner in attempting to deter such intellectual property theft is the use of deception technology. Such deception technology enables a more proactive security posture by seeking to deceive the attackers, detect them and then defeat them, allowing the enterprise to return to normal operations.

For example, some cybersecurity systems use "honey" files to attract attackers. Once an attacker accesses such a file, the access is logged and security officers are notified. A related effort develops the D3® system which uses decoy documents with attractive names to lure insiders who pose a threat. Another cybersecurity system generates decoy software by modifying genuine software into bogus programs using obfuscation techniques. The bogus programs contain a beacon which indicates when and where the decoy is accessed. A further cybersecurity system generates "canary files" to detect network intrusion. A canary file is a fake document placed amongst real documents in order to rapidly detect unauthorized data access, copying or modification. Such a canary file needs to be a realistic decoy, which requires careful examination of all the topics that can be manipulated to generate fake documents, which is time-consuming and difficult to scale.

Unfortunately, such systems are deficient in that they do not specify how to automatically choose the topics/concepts in the original document that should be replaced in order to generate fake documents. Furthermore, such systems simply focus on changes to numeric data, such as credit card numbers, social security numbers, automated teller machine (ATM) personal identification number (PIN) codes as well as addresses and other structured fields which is not sufficient in generating fake technical documents. Additionally, such systems do not attempt to ensure that the fake documents are close enough to the original document to make the fake documents believable, but sufficiently "far enough" to make them likely to be wrong.

Such deficiencies have been attempted to be addressed by a cybersecurity system referred to as the "FORGE" system. The FORGE system builds a multi-layer graph of the concepts in a real document and computes certain "meta-centrality" measures on the multi-layer graph to select concepts in the original document to replace. Once a concept is selected for replacement, the FORGE system requires an ontology pertinent to the domain of the documents in order to select a suitable replacement term. For example, if the fake documents are being developed by a company creating pacemakers for the heart, then the ontology may relate to biomedical heart devices.

However, the FORGE system requires good ontologies. That is, the FORGE system assumes that there is an ontology available for a given domain and that this ontology is appropriate for the domain in question. Though a number of ontologies do exist for various knowledge representation purposes, they do not exist for numerous domains, especially specialized domains. Moreover, they are financially expensive and time consuming to develop.

Furthermore, the FORGE system may not select the best concept-replacement pairs. The FORGE system first selects a set of concepts to replace in the original document d. For each selected concept, it then identifies a set of appropriate replacement concepts which it uses to generate the fake documents. However, this is suboptimal. For instance, a concept c in the original document may be an excellent one to replace in theory, but there may be no really good replacement terms for it. Because the concepts to replace are fixed without considering the availability and/or quality of the replacement, this can lead to suboptimal choices.

Additionally, in the FORGE system, the replacements chosen for a given concept may be deterministic. Replacing a concept c by the same replacement concept c' across multiple documents may make it easier for an adversary to detect the replacement concepts.

Furthermore, in the FORGE system, the set $\mathcal{F}$ of fake documents generated may be very similar. That is, the FORGE system does not ensure that there is diversity in the set of fake documents generated. For instance, if one wishes to generate 99 fake documents, it is possible that the FAKE system generates 99 fakes that all differ very minimally from each other because the set of (concept, replacement) pairs used to generate each fake document vary minimally.

As a result, current cybersecurity systems, such as the FORGE system, are deficient in the protection of data (e.g., electronic documents), such as deterring intellectual property theft.

SUMMARY

In one embodiment of the present disclosure, a computer-implemented method for generating fake documents comprises extracting concepts from a document. The method further comprises computing concept importance values for the extracted concepts. The method additionally comprises clustering the extracted concepts into bins according to the computed concept importance values. Furthermore, the method comprises solving a joint optimization problem to identify both concepts in the document to be replaced using the clustered concepts in the bins as well as corresponding replacement concepts obtained from clustered concepts in a corpus of domain specific documents, where the concepts in the corpus of domain specific documents are clustered by clustering embeddings vectors, and where word embeddings are identified for each word in documents of the corpus of domain specific documents as the embedding vectors. Additionally, the method comprises replacing the identified concepts in the document with corresponding identified replacement concepts to generate a fake document.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

As stated in the Background section, cybersecurity systems are deficient in that they do not specify how to automatically choose the topics/concepts in the original document that should be replaced in order to generate fake documents. Furthermore, such systems simply focus on changes to numeric data, such as credit card numbers, social security numbers, automated teller machine (ATM) personal identification number (PIN) codes as well as addresses and other structured fields which is not sufficient in generating fake technical documents. Additionally, such systems do not attempt to ensure that the fake documents are close enough to the original document to make the fake documents believable, but sufficiently "far enough" to make them likely to be wrong.

Such deficiencies have been attempted to be addressed by a cybersecurity system referred to as the "FORGE" system. The FORGE system builds a multi-layer graph of the concepts in a real document and computes certain "meta-centrality" measures on the multi-layer graph to select concepts in the original document to replace. Once a concept is selected for replacement, the FORGE system requires an ontology pertinent to the domain of the documents in order to select a suitable replacement term. For example, if the fake documents are being developed by a company creating pacemakers for the heart, then the ontology may relate to biomedical heart devices.

However, the FORGE system requires good ontologies. That is, the FORGE system assumes that there is an ontology available for a given domain and that this ontology is appropriate for the domain in question. Though a number of ontologies do exist for various knowledge representation purposes, they do not exist for numerous domains, especially specialized domains. Moreover, they are financially expensive and time consuming to develop.

Furthermore, the FORGE system may not select the best concept-replacement pairs. The FORGE system first selects a set of concepts to replace in the original document d. For each selected concept, it then identifies a set of appropriate replacement concepts which it uses to generate the fake documents. However, this is suboptimal. For instance, a concept c in the original document may be an excellent one to replace in theory, but there may be no really good replacement terms for it. Because the concepts to replace are fixed without considering the availability and/or quality of the replacement, this can lead to suboptimal choices.

Additionally, in the FORGE system, the replacements chosen for a given concept may be deterministic. Replacing a concept c by the same replacement concept c' across multiple documents may make it easier for an adversary to detect the replacement concepts.

Furthermore, in the FORGE system, the set $\mathcal{F}$ of fake documents generated may be very similar. That is, the FORGE system does not ensure that there is diversity in the set of fake documents generated. For instance, if one wishes to generate 99 fake documents, it is possible that the FAKE system generates 99 fakes that all differ very minimally from each other because the set of (concept, replacement) pairs used to generate each fake document vary minimally.

As a result, current cybersecurity systems, such as the FORGE system, are deficient in the protection of data (e.g., electronic documents), such as deterring intellectual property theft.

The embodiments of the present invention provide a means for cybersecurity systems to improve their protection of data by automatically generating fake versions of a given document (e.g., technical document) in that the fake versions are similar enough to the original document to be credible but sufficiently different from each other. Additionally, the fake versions are generated in a manner that incorporate some degree of randomness in them that makes it harder for an adversary to reverse engineer.

In particular, embodiments of the present invention merge word embeddings and clustering in order to identify potential replacements for concepts. For example, given a concept c in the real document, embodiments of the present invention develop embeddings for the concepts (in embeddings, each concept is represented as a vector) and then cluster the resulting set of word embeddings (and hence the concepts themselves). The idea is that if a concept c' is in the same cluster as c, then c' could serve as a possible replacement for c, with the probability of c' being a good replacement for c being inversely proportional to the distance between c and c' according to a distance metric chosen by the system security manager.

In one embodiment of the present invention, the problem of selecting the best concept to replace and the best replacement is posed as two Joint Concept Replacement (JCR) problems (JCR-Implicit and JCR-Explicit) in which the concept selected for replacement depends upon the quality of the replacements that are available. Furthermore, in one embodiment, both the JCR problems are NP-hard (non-deterministic polynomial-time hard).

Additionally, in one embodiment of the present invention, in order to ensure diversity in the set of fake documents generated, a regularization is incorporated in the objective function of the JCR problems to ensure diversity. The level of diversity can be easily regulated on an application by application basis.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
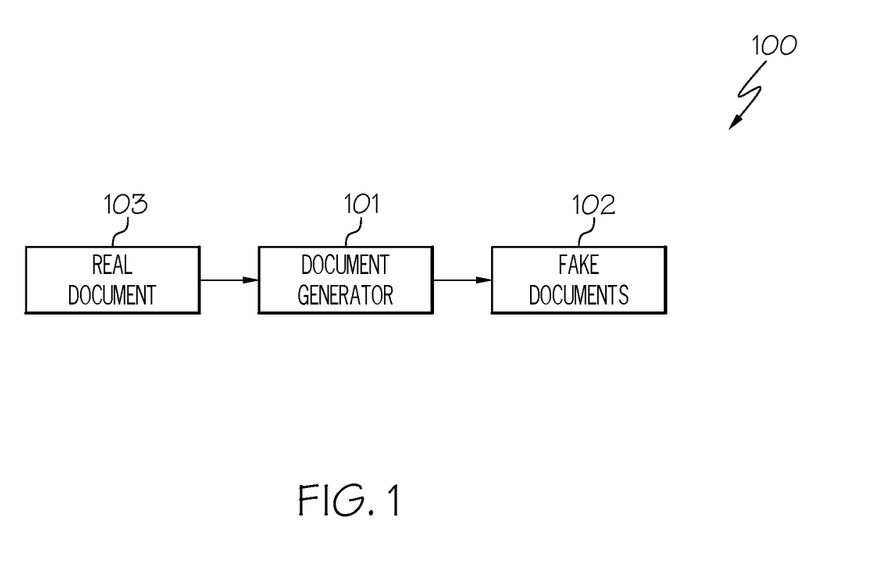
FIG. 1 illustrates an embodiment of the present invention of a cybersecurity system for practicing the principles of the present invention.

Referring now to the Figures in detail, FIG. 1 illustrates an embodiment of the present disclosure of a cybersecurity system 100 for practicing the principles of the present invention. System 100 includes a document generator 101 configured to generate a set of fake documents 102 based upon the receipt of a "real" document 103. A "real document" 103, as used herein, refers to an authentic and genuine document, such as an electronic technical document. A "fake document" 102, as used herein, refers to an electronic document that appears to be a real document, but in reality, is not a real document. The goal of a fake document is to convince an individual, such as an intruder, that what is being presented is real.

As discussed above, document generator 101 is configured to generate a set of fake documents 102 based upon the receipt of a "real" document 103. A discussion regarding the software components used by document generator 101 to perform such functions is discussed below in connection with FIG. 2.

Figure 2:
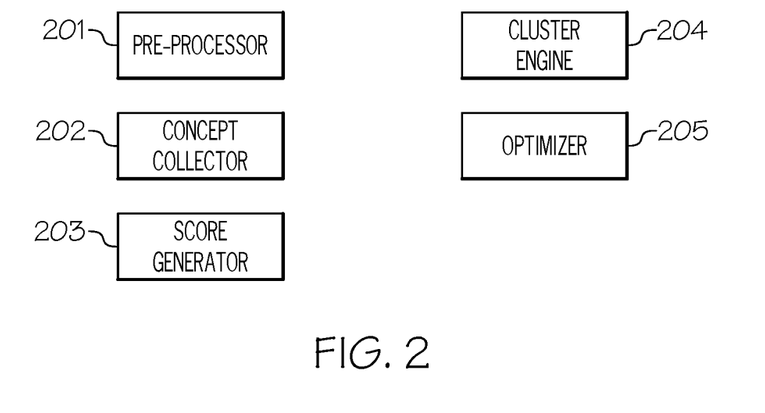
FIG. 2 is a diagram of the software components of the document generator used to generate a set of fake documents based upon the receipt of a real document in accordance with an embodiment of the present invention.

FIG. 2 is a diagram of the software components of document generator 101 (FIG. 1) used to generate a set of fake documents 102 (FIG. 1) based upon the receipt of a real document 103 (FIG. 1) in accordance with an embodiment of the present invention.

Referring to FIG. 2, document generator 101 includes a pre-processor 201 configured to cluster words in a corpus of domain specific documents together by clustering the embedding vectors. In one embodiment, pre-processor 201 builds a corpus of domain specific documents, such as documents regarding cockpit systems, aircraft guidance systems, thermostats, etc.

In one embodiment, pre-processor 201 is further configured to identify the word embeddings for each word in the documents of the built corpus as embedding vectors, such as via Word2Vec. A word embedding associates a numeric vector with each word. In one embodiment, given a word w, a co-occurrence vector is associated with w that captures some aspect of co-occurrence of the word w with other words w' in the vocabulary. These co-occurrence vectors can then be mapped to a lower dimensional space generating the final vector (i.e., embedding) associated with word w. In one embodiment, such word embeddings are learned via the use of Word2Vec, including learning the word embeddings of sub-words. Thus, each n-gram (n-gram is a contiguous sequence of n items from a given sample of text or speech) from the domain-specific corpus of interest is reduced to a numeric "embedding" vector. In one embodiment, $v_c$ is used to denote the word vector associated with an n-gram c. Thus, a word embedding associates a unique vector $v_c$ with each concept c∈C.

In one embodiment, pre-processor 201 is further configured to perform word pruning. Once a domain specific document corpus has been constructed above, pre-processor 201 may utilize part of speech (POS) tagging tools, such as NLTK (Natural Language Toolkit), to automatically eliminate certain types of words from consideration of being replaced. Such eliminated words can include: stop words (e.g., "the," "and"), words belonging to certain parts of speech, such as adverbs (e.g., "very," "really"), adjectives (e.g., "good," "intelligent"), and even verbs (e.g., "buy," "said") because such words are very unlikely to contribute to the technical content of a document. In one embodiment, pre-processor 201 prunes out words other than nouns. In one embodiment, pre-processor 201 prunes out bigrams (two words) or trigrams (three words) rather than just a single word.

In one embodiment, pre-processor 201 is further configured to perform inverse document frequency computations. For each concept c, pre-processor 201 computes the inverse document frequency of that concept or word from the corpus.

In one embodiment, pre-processor 201 is further configured to cluster word embeddings. The idea is that if a word/concept is in a cluster, then any member of that cluster could potentially be a replacement of that word. Because each word is now represented as an embedding vector, pre-processor 201 generates clusters of these vectors in order to cluster the words together. In one embodiment, pre-processor 201 uses standard k-means clustering with a Euclidean distance in order to generate clusters. To select the best k value, in one embodiment, pre-processor 201 uses the concept of silhouette (refers to a method of interpretation and validation of consistency within clusters of data) score to evaluate the clustering quality.

Furthermore, as shown in FIG. 2, document generator 101 includes a concept collector 202 configured to extract key concepts. A "concept," as used herein, refers to an abstract idea or a general notion, such as a mental representation. In one embodiment, concept collector 202 extracts concepts by identifying nouns using natural language processing, which are extracted. For example, concept collector 202 may utilize natural language processing to perform context analysis of document 103 to identify noun phrases. Noun phrases are part of speech patterns that include a noun. They can also include whatever other parts of speech make grammatical sense, and can include multiple nouns. Some common noun phrase patterns are: Noun; Noun-Noun . . . Noun; Adjective(s)-Noun; and Verb-Adjective(s)-Noun. For example, "red dog" is an adjective-noun part of a speech pattern. In another example, "cavorting green elk" is a verb-adjective-noun pattern.

In one embodiment, concept collector 202 identifies concepts in document 103 using natural language processing by identifying terms that are stored in a list of concepts.

In one embodiment, concept collector 202 identifies concepts in document 103 using keyphrase identification. The most important topical terms for a document are referred to herein as "keyphrases," which correspond to concepts. Document keyphrases provide a concise summary of a document's content, offering semantic metadata summarizing and characterizing a document. In one embodiment, concept collector 202 identifies the keyphrases in document 103 using machine learning algorithms, such as conditional random field and support vector machine. For example, the support vector machine algorithm infers a function from labeled training data consisting of a set of training examples (e.g., sample concepts, such as concepts in a particular domain). Such a function is used to map an input to an output based on example input-output pairs.

Additionally, as shown in FIG. 2, document generator 101 includes a score generator 203 configured to compute the term frequency, inverse document frequency (TFIDF) metric for all the extracted key concepts. It is noted that this measure can be replaced by other metrics of the importance of concepts. Moreover, it is noted that the inverse document frequency of all documents may have been previously computed by pre-processor 201. As a result, score generator 203 may simply compute term frequencies and multiply them with the pre-computed inverse document frequencies.

Furthermore, as shown in FIG. 2, document generator 101 includes a cluster engine 204 configure to cluster these concepts into bins according to these measurements (term frequency, inverse document frequency measurements). In one embodiment, $\xi$ (c, d, D) is used to denote the TFIDF of concept c in document d with respect to corpus D. In one embodiment, cluster engine 204 places the concepts into concept importance bins. In one embodiment, the concepts in document d are sorted in ascending order of TFIDFs and then evenly group the concepts into n bins $B_1, \ldots, B_n$ based on their concept importance values such that for all i, $j \in 1, \ldots, n$ where $i<j$, and $c \in B_i$, $c' \in B_j$ one has $\xi$ (c, d, D)$\leq \xi$ (c', d, D). When d, D are clear from context, the notation of $\xi_c$ is used to denote $\xi$ (c, d, D).

Additionally, as shown in FIG. 2, document generator 101 includes an optimizer 205 configured to find the concepts c to replace in document d and their corresponding replacements c'. In one embodiment, optimizer 205 finds such concepts c by solving a joint optimization problem. Once a set $\{(c_1, c'_1), \ldots, (c_h, c'_h)\}$ of concepts $c_i$ and their replacements $c'_i$ are discovered above, the replacements are made.

A further description of the functionality of these components is provided below in connection with FIGS. 4-5 regarding the discussion of generating fake documents using word embeddings. A description of the hardware configuration of document generator 101 is provided below in connection with FIG. 3.

Figure 3:
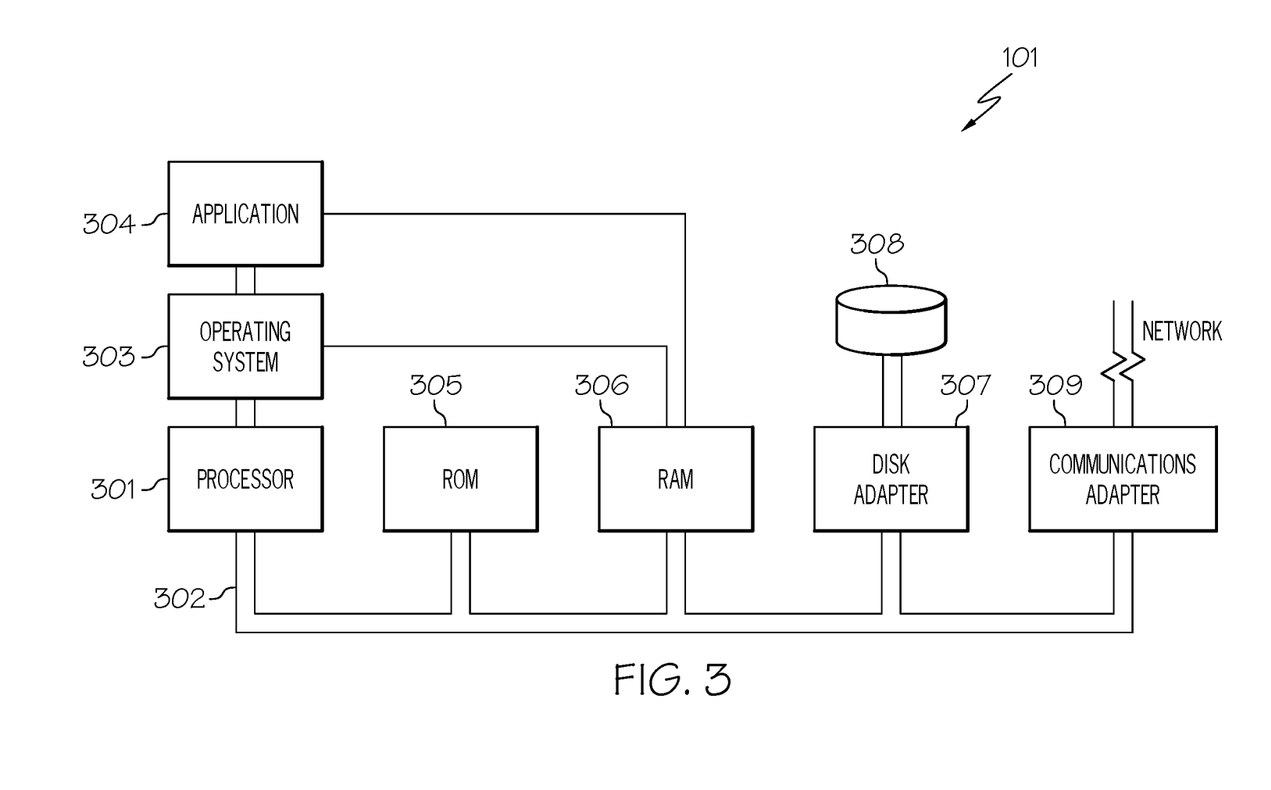
FIG. 3 illustrates an embodiment of the present invention of the hardware configuration of the document generator which is representative of a hardware environment for practicing the present invention.

Referring now to FIG. 3, FIG. 3 illustrates an embodiment of the present invention of the hardware configuration of document generator 101 (FIG. 1) which is representative of a hardware environment for practicing the present invention.

Document generator 101 has a processor 301 connected to various other components by system bus 302. An operating system 303 runs on processor 301 and provides control and coordinates the functions of the various components of FIG. 3. An application 304 in accordance with the principles of the present disclosure runs in conjunction with operating system 303 and provides calls to operating system 303 where the calls implement the various functions or services to be performed by application 304. Application 304 may include, for example, pre-processor 201 (FIG. 2), concept collector 202 (FIG. 2), score generator 203 (FIG. 2), cluster engine 204 (FIG. 2) and optimizer 205 (FIG. 2). Furthermore, application 304 may include, for example, a program for generating fake documents using word embeddings as discussed further below in connection with FIGS. 4 and 5.

Referring again to FIG. 3, read-only memory ("ROM") 305 is connected to system bus 302 and includes a basic input/output system ("BIOS") that controls certain basic functions of document generator 101. Random access memory ("RAM") 306 and disk adapter 307 are also connected to system bus 302. It should be noted that software components including operating system 303 and application 304 may be loaded into RAM 306, which may be document generator's 101 main memory for execution. Disk adapter 307 may be an integrated drive electronics ("IDE") adapter that communicates with a disk unit 308, e.g., disk drive. It is noted that the program for generating fake documents using word embeddings, as discussed further below in connection with FIGS. 4 and 5, may reside in disk unit 308 or in application 304.

Document generator 101 may further include a communications adapter 309 connected to bus 302. Communications adapter 309 interconnects bus 302 with an outside network to communicate with other devices.

In one embodiment, application 304 of document generator 101 includes the software components of pre-processor 201, concept collector 202, score generator 203, cluster engine 204 and optimizer 205. In one embodiment, such components may be implemented in hardware, where such hardware components would be connected to bus 302. The functions discussed above performed by such components are not generic computer functions. As a result, document generator 101 is a particular machine that is the result of implementing specific, non-generic computer functions.

In one embodiment, the functionality of such software components of document generator 101, including the functionality for generating fake documents using word embeddings, may be embodied in an application specific integrated circuit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, current cybersecurity systems, such as the FORGE system, are deficient in the protection of data (e.g., electronic documents), such as deterring intellectual property theft.

Figure 4:
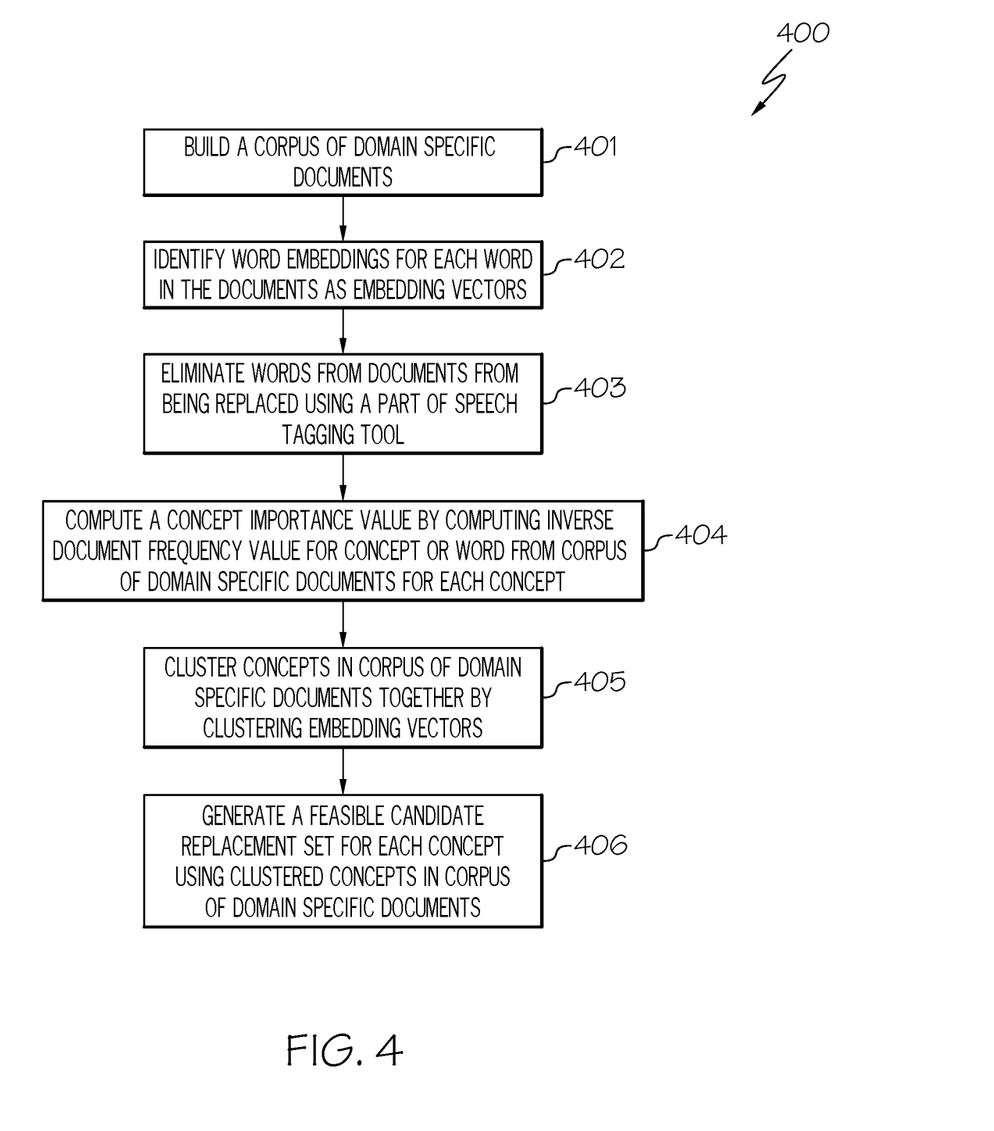
FIG. 4 is a flowchart of a method for building a cluster of concepts to be used as replacements for concepts in a real document in accordance with an embodiment of the present invention.
Figure 5:
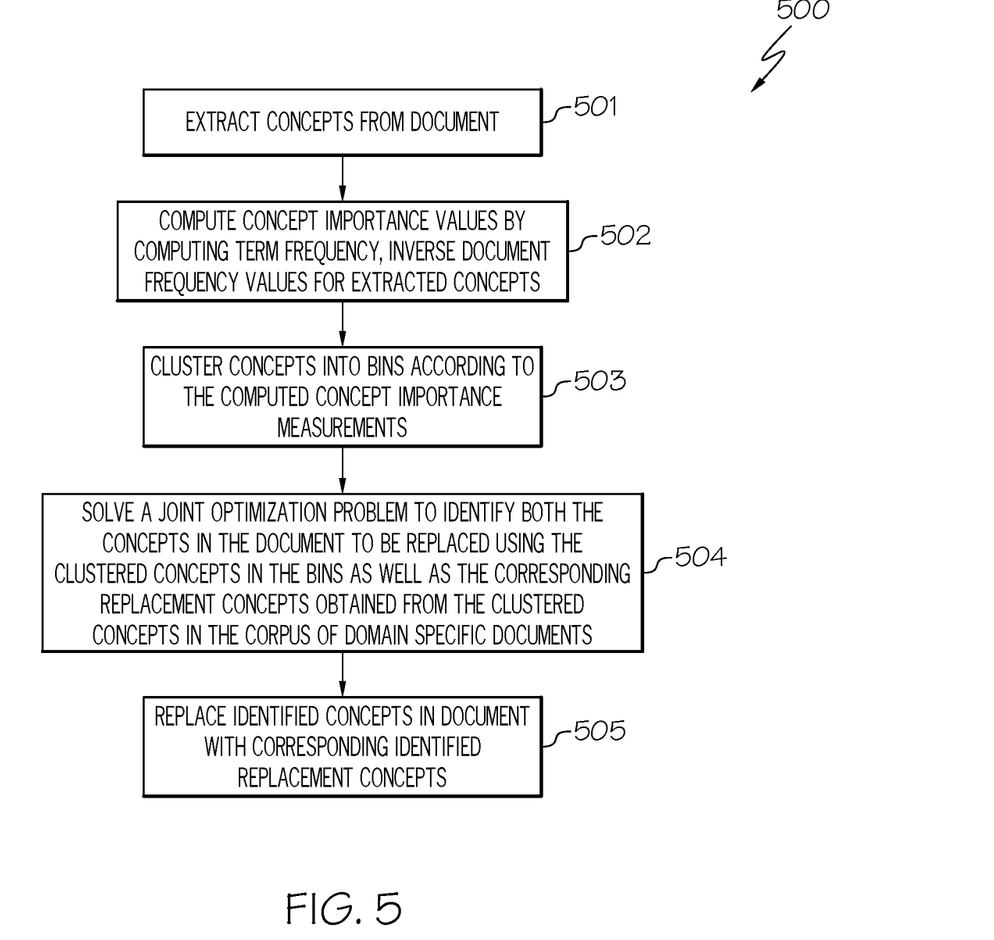
FIG. 5 is a flowchart of a method for generating fake documents based on the real document in accordance with an embodiment of the present invention.

The embodiments of the present invention provide a means for improving cybersecurity systems in protecting data, such as improving the deterrence of intellectual property theft, by automatically generating fake versions of a given document (e.g., technical document) in that the fake versions are similar enough to the original document to be credible yet sufficiently different from each other while incorporating some degree of randomness to make it difficult for an adversary to reverse engineer as discussed below in connection with FIGS. 4 and 5. FIG. 4 is a flowchart of a method for building a cluster of concepts to be used as replacements for concepts in a real document. FIG. 5 is a flowchart of a method for generating fake documents based on the real document.

As stated above, FIG. 4 is a flowchart of a method 400 for building a cluster of concepts to be used as replacements for concepts in a real document in accordance with an embodiment of the present invention.

Referring to FIG. 4, in conjunction with FIGS. 1-3, in step 401, pre-processor 201 of document generator 101 builds a corpus of domain specific documents. For example, in an exemplary enterprise, Honeywell®, may need to generate one corpus of documents about cockpit systems, another corpus about aircraft guidance systems, another one on home thermostats and so forth. In one embodiment, such a corpora could be built by performing searches on the Internet, such as Google® patents or Google® scholar, or from within their own enterprise file system. In one embodiment, such a corpora may already preexist in the organization. As a result, such a corpus of domain specific documents may not need to be built.

In step 402, pre-processor 201 of document generator 101 identifies word embeddings for each word in the documents (documents in corpus of domain specific documents) as embedding vectors. A word embedding associates a numeric vector with each word. In one embodiment, given a word, pre-processor 201 associates a co-occurrence vector with w that captures some aspect of co-occurrence of the word w with other words w' in the vocabulary. These co-occurrence vectors can then be mapped to a lower dimensional space generating the final vector (i.e., embedding) associated with word w. In one embodiment, such embeddings are generated using Word2Vec. Furthermore, in one embodiment, pre-processor 201 utilizes Word2Vec to learn word embeddings of sub-words. Thus, at the end of this step, each n-gram (contiguous sequence of n items from a given sample of text or speech) from the domain-specific corpus of interest is reduced to a numeric "embedding" vector. The notation $v_c$ is used herein to denote the word vector associated with an n-gram c. Thus, the word embedding associates a unique vector $v_c$ with each concept c∈C.

In step 403, pre-processor 201 of document generator 101 eliminates words from documents (documents in corpus of domain specific documents) from being replaced using a part of speech tagging tool. Once a domain specific document corpus has been constructed above, pre-processor 201 uses a part of speech (POS) tagging tool, such as NLTK, to automatically eliminate certain types of words from consideration of being replaced. Such eliminated words can include: stop words (e.g., "the," "and"), words belonging to certain parts of speech, such as adverbs (e.g., "very," "really"), adjectives (e.g., "good," "intelligent"), and even verbs (e.g., "buy," "said") because such words are very unlikely to contribute to the technical content of a document.

In one embodiment, pre-processor 201 prunes out words other than nouns. In one embodiment, pre-processor 201 prunes out bigrams (two words) or trigrams (three words) rather than just a single word.

In step 404, pre-processor 201 of document generator 101 computes the concept importance value by, for example, computing the inverse document frequency value for the concept or word from the corpus of domain specific documents that was not eliminated in step 403 for each concept. As previously discussed, the word embedding of step 402 associates a unique vector $v_c$ with each concept c∈C. Pre-processor 201 then computes the inverse document frequency for each of these concepts associated with the words that were not eliminated in step 403. The inverse document frequency is a measure of whether a term is common or rare in a given document corpus. It is obtained by dividing the total number of documents by the number of documents containing the term in the corpus.

In step 405, pre-processor 201 of document generator 101 clusters the concepts in the corpus of domain specific documents together by clustering embedding vectors. The idea is that if a word/concept is in a cluster, then any member of that cluster could potentially be a replacement of that word. Because each word is now represented as an embedding vector, pre-processor 201 generates clusters of these vectors in order to cluster the words together. In one embodiment, pre-processor 201 utilizes the standard k-means clustering with a Euclidean distance in order to generate the clusters.

In one embodiment, to select the best k value of the standard k-means clustering, pre-processor 201 uses the concept of silhouette score to evaluate the clustering quality. The silhouette value is a measure of how similar an object (concept) is to its own cluster (cohesion) compared to other clusters (separation). The silhouette ranges from −1 to +1, where a high value indicates that the object (concept) is well matched to its own cluster and poorly matched to neighboring clusters. Table 1 shown below shows the results of different silhouette scores of different k values.

TABLE 1

| Silhouette scores of different k values | | | | | | | | |
|---|---|---|---|---|---|---|---|---|
| k | | | | | | | | |
| 1000 | 1500 | 2000 | 2500 | 3000 | 3500 | 4000 | 4500 | 5000 |
| Score 0.0124 | 0.0113 | 0.0109 | 0.0046 | 0.0051 | 0.0072 | 0.0063 | 0.0063 | 0.0066 |

In one embodiment, k is equal to 1,000 for the word embedding clusters because it has the largest silhouette score.

After clustering, in step 406, pre-processor 201 of document generator 101 generates a feasible candidate replacement set $\mathcal{F}$ C(c) for each concept c using the clustered concepts in the corpus of domain specific documents. For example, the feasible replacement set $\mathcal{F}$ C(c) includes the concepts that are clustered for the concept c. It is from this feasible replacement set that a concept is selected by document generator 101 to replace a concept in real document 103 to generate fake document 102 as discussed further below in connection with FIG. 5.

It is important to note that all of these pre-processing steps discussed above in connection with FIG. 4 may be performed before generating any fake documents. Furthermore, it is noted that method 400 may be used for different product lines (e.g., cockpit instruments, vaccine manufacturing, etc.) thereby deriving different embeddings and clusters.

Referring now to FIG. 5, FIG. 5 is a flowchart of a method 500 for generating fake documents based on the real document in accordance with an embodiment of the present invention.

Referring to FIG. 5, in conjunction with FIGS. 1-4, in step 501, concept collector 202 of document generator 101 extracts concepts from real document 103. A "concept," as used herein, refers to an abstract idea or a general notion, such as a mental representation. In one embodiment, concept collector 202 extracts concepts by identifying nouns using natural language processing, which are extracted. For example, concept collector 202 may utilize natural language processing to perform context analysis of document 103 to identify noun phrases. Noun phrases are part of speech patterns that include a noun. They can also include whatever other parts of speech make grammatical sense, and can include multiple nouns. Some common noun phrase patterns are: Noun; Noun-Noun . . . Noun; Adjective(s)-Noun; and Verb-Adjective(s)-Noun. For example, "red dog" is an adjective-noun part of a speech pattern. In another example, "cavorting green elk" is a verb-adjective-noun pattern.

In one embodiment, concept collector 202 identifies concepts in document 103 using natural language processing by identifying terms that are stored in a list of concepts.

In one embodiment, concept collector 202 identifies concepts in document 103 using keyphrase identification. The most important topical terms for a document are referred to herein as "keyphrases," which correspond to concepts. Document keyphrases provide a concise summary of a document's content, offering semantic metadata summarizing and characterizing a document. In one embodiment, concept collector 202 identifies the keyphrases in document 103 using machine learning algorithms, such as conditional random field and support vector machine. For example, the support vector machine algorithm infers a function from labeled training data consisting of a set of training examples (e.g., sample concepts, such as concepts in a particular domain). Such a function is used to map an input to an output based on example input-output pairs.

In step 502, score generator 203 of document generator 101 computes the concept importance values by, for example, computing the term frequency, inverse document frequency (TFIDF) values for the extracted concepts (concepts extracted in step 501). TFIDF is a numerical statistic that is intended to reflect how important a concept is to a document in a collection or corpus. The TFIDF value increases proportionally to the number of times a word (concept) appears in the document and is offset by the number of documents in the corpus that contain the word (concept), which helps to adjust for the fact that some words (concepts) appear more frequently in general. The term frequency (TF) measures the frequency of a word (concept) in a document. For example, TF equals the number of times the word occurs in the text divided by the total number of words in the text. Inverse document frequency (IDF) measures the rank of the specific word for its relevancy within the text. For example, IDF equals the total number of documents divided by the number of documents with the word in it. TFIDF is then the product of TF and IDF.

It is noted that the TFIDF measurement can be replaced by other metrics of the importance of concepts. Moreover, it is noted that the IDF of documents (documents in the corpus of domain specific documents) was already computed during the pre-processing step of step 404, so step 502 may only involve computing term frequencies and multiplying them with the pre-computed IDFs (assuming that document 103 was a document in the corpus of domain specific documents of step 401 and that the IDF of document 103 was previously computed). As used herein, $\xi(c, d, D)$ denotes the TFIDF of concept c in document d with respect to corpus D.

In step 503, cluster engine 204 of document generator 101 clusters the concepts (extracted concepts of step 501) into bins according to the computed concept importance values (e.g., TFIDF measurements). Such bins may be referred to herein as "concept importance bins." In one embodiment, cluster engine 204 sorts the concepts in document d in ascending order based on their TFIDF measurements and then evenly group the concepts into n bins $B_1, \ldots, B_n$ based on their concept importance values such that for all i, $j \in 1, \ldots, n$ where i<j, and $c \in B_i$, $c' \in B_j$ and $\xi(c, d, D) \leq \xi(c', d, D)$. When d, D are clear from context, $\xi_c$ denotes $\xi(c, d, D)$.

In step 504, optimizer 205 of document generator 101 solves a joint optimization problem to identify both the concepts in document 103 to be replaced using the clustered concepts in the bins (see step 503) as well as the corresponding replacement concepts obtained from the clustered concepts in the corpus of domain specific documents (see step 405). That is, optimizer 205 identifies the concepts c to replace in document d 103 and their corresponding replacements c'. This is performed by solving a joint optimization problem discussed further below.

In step 505, optimizer 205 of document generator 101 replaces the identified concepts in document 103 with the corresponding identified replacement concepts as disused further below. That is, once a set $\{(c_1, c'_1), \ldots, (c_h, c'_h)\}$ of concepts $c_i$ and their replacements $c'_i$ are discovered, the replacements are made.

The following discusses how to use the concepts defined above in order to automatically generate a set $\mathcal{F}$ of fake documents. The principles of the present invention implement two different methods, each of which involves solving an optimization problem. In both methods, in one embodiment, there is a directory with $\mathcal{F}$ copies of the original document d. Each $f \in \mathcal{F}$ will be used to create a fake version of d.

In one embodiment, optimizer 205 uses the replacement method referred to herein as the "explicit joint concept replacement." In one embodiment, optimizer 205 develops a natural nonlinear integer optimization problem that determines how to create a set F of fake documents. In one embodiment, optimizer 205 develops an equivalent linear version as discussed further below. The nonlinear integer optimization problem (1) is shown below:

$$\min \left( \sum_{f \in \mathcal{F}} \sum_{c \in d} \sum_{c' \in \mathcal{F}C(c)} dist(c, c') \cdot \xi_c \cdot X_{c,c',f} \right) - \tag{1}$$

$$\left( \lambda \sum_{c \in d} \sum_{f \in \mathcal{F}} \sum_{f' \in \mathcal{F}} \left| \sum_{c' \in \mathcal{F}C(c)} X_{c,c',f} - \sum_{c' \in \mathcal{F}C(c)} X_{c,c',f'} \right| \right)$$

subject to (i) $\sum_{f \in \mathcal{F}} \sum_{c' \in \mathcal{F}C(c)} X_{c,c',f} \geq \mu, \forall c \in \mathcal{B}$ (ii) $\sum_{c \in d} \sum_{c' \in \mathcal{F}C(c)} X_{c,c',f} \geq N_l, \forall f \in \mathcal{F}$ (iii) $\sum_{c \in d} \sum_{c' \in \mathcal{F}C(c)} dist(c, c') X_{c,c',f} \geq T_f, \forall f \in \mathcal{F}$ (iv) $X_{c,c',f} = 0, \forall c \notin \mathcal{B}, \forall c' \in \mathcal{F}C(c), f \in \mathcal{F}$ (v) $X_{c,c',f} \in \{0, 1\}, \forall c \in d, c' \in \mathcal{F}C(c), f \in \mathcal{F}$ (vi) $\sum_{c' \in \mathcal{F}C(c)} X_{c,c',f} \leq 1, \forall c \in d, f \in \mathcal{F}$ Given an original document d, $|\mathcal{F}|$ copies of d are created. The integer program below then provides a method to identify pairs (c, c') of concepts such that c is in the original document d and $c' \in \mathcal{F}C(c)$ is a feasible replacement concept for c in file $f \in \mathcal{F}$. In one embodiment, this is achieved by using an integer variable $X_{c,c',f} \in \{0, 1\}$ which is set to 1 if the replacement for c in file $f \in \mathcal{F}$ is c' and 0 otherwise. The integer optimization problem described in (1) assumes that the only concepts that are replaced are from a set B of bins selected by the system security officer.

The following discusses the constraints of the optimization problem in connection with the explicit joint concept replacement method (see optimization problem (1)). Constraint (i) indicates that a concept in the selected set B of bins should be replaced at least μ times to ensure that fake documents are sufficiently different from d. The selection of a set of bins suggests that the replacement concepts c' for c should not be "too close" to the original c nor should they be "too far" away. In one embodiment, this constraint specifies a range of concept importance values. For example, if n=10, and B={$B_8$, $B_9$}, the concept importance values (e.g., TFIDF scores) are within the 70%~ 90% th percentile of all concept importance values. Constraint (ii) requires that at least $N_l$ concepts must be replaced in any of the fake documents f∈ $\mathcal{F}$. Constraint (iii) states that for each fake document f∈ $\mathcal{F}$, the sum of the distances of the selected concepts and their replacements should not be smaller than a threshold $T_f$ (so that the fake document will be significantly different from the original document in order to make important information in the original document "wrong"). Constraint (iv) states that if a concept c is not in the selected bins B, then it cannot be replaced in any of the files. Constraint (v) states that the variables are binary. Constraint (vi) ensures that for any given fake document f and any given concept c, at most one of the concepts in the feasible candidate set $\mathcal{F}$ C(c) is used to replace c. In one embodiment, parameters λ, μ, $N_l$, $T_f$, and B are specified by the system manager. For instance, in the Honeywell example, the system security officer for Honeywell would specify these explicitly.

It is noted that constraint (ii) states that at least $N_l$ concepts in the original document must be replaced but does not, for instance, place an upper bound on the number of concepts replaced. Similarly, constraint (iii) requires that in any given fake file f, the sum of the distances between a concept c and its replacement c' must exceed $T_f$ (threshold), but provides no upper bound. The reason such constraints are not specified explicitly is because they are effectively enforced in the objective function in the optimization problem which is discussed below.

In one embodiment, the objective function contains two terms. The first term (the triple summation) in the objective function indicates a desire to replace a concept which has feasible candidate replacement concepts that are "close" to it. At the same time, the objective function desires to minimize the sum of the TFIDFs of the selected concepts, subject of course to the requirement in constraint (iv) that they are from the set B of bins (which ensures that they are important enough). This enables optimizer 205 to make the generated fake documents as indistinguishable from the original document as possible as long as they belong to the bins B (which effectively regulates how "far away" a replacement concept can be). It is noted that the second term of the objective function looks at every triple of the form (c, f, f') where c is a concept in the original document and f, f' are fake files. The summation in this term tries to maximize the difference between whether the concept c is replaced in both files f, f'. It is noted that this summation $\Sigma_{c \in d} \Sigma_{f \in \mathcal{F}} \Sigma_{f' \in \mathcal{F}} \Sigma_{c' \in \mathcal{F} C(c)} X_{c,c',f} \Sigma_{c'e} \Sigma_{c' \in \mathcal{F} C(c)} X_{c,c',f'}|$ is desired to be as large as possible in order to ensure diversity of concepts that are replaced across all the fake documents generated. In one embodiment, this summation is multiplied by (−λ) in order to achieve this.

Unfortunately, the objective function in the integer optimization problem solved by optimizer 205 is nonlinear because of the presence of the absolute value in the second regularization term of the objective function. As a consequence, this problem may be hard to solve. To avoid this non-linear objective function, in one embodiment, a set of binary auxiliary variables is introduced, $Y_{c,f,f'}$, where for each c∈d, f, f'∈ $\mathcal{F}$:

$$Y_{c,f,f'} \leq 2 - \sum_{c' \in \mathcal{F}C(c)} X_{c,c',f} - \sum_{c' \in \mathcal{F}C(c)} X_{c,c',f'} \quad (2)$$

$$Y_{c,f,f'} \leq \sum_{c' \in \mathcal{F}C(c)} X_{c,c',f} - \sum_{c' \in \mathcal{F}C(c)} X_{c,c',f'}$$

$$Y_{c,f,f'} \in \{0, 1\}$$

The new objective function in Eq. (1) is now:

$$\min \sum_{f \in \mathcal{F}} \sum_{c \in d} \sum_{c' \in \mathcal{F}C(c)} dist(c, c') \cdot \xi_c \cdot X_{c,c',f} - \lambda \sum_{c \in d} \sum_{f \in \mathcal{F}} \sum_{f' \in \mathcal{F}} Y_{c,f,f'} \quad (3)$$

The following proposition guarantees the equivalence of the original and the linearized objective functions:

Proposition 1. The objective function in Eq. (3) combined with Eq. (2) is equivalent to the objective in Eq. (1).

Proof. It suffices to prove that for each c∈d, f, f'∈ $\mathcal{F}$, the objective $|\Sigma_{c' \in \mathcal{F}C(c)} X_{c,c',f} - \Sigma_{c' \in \mathcal{F}C(c)} X_{c,c',f'}|$ is equivalent to $Y_{c,f,f'}$ with the constraints in Eq. (2). It is proved by considering the following two cases.

First, when $\Sigma_{c' \in \mathcal{F}C(c)} X_{c,c',f} = \Sigma_{c' \in \mathcal{F}C(c)} X_{c,c',f'}$. Due to constraint (vi), this means $\Sigma_{c' \in \mathcal{F}C(c)} X_{c,c',f} = \Sigma_{c' \in \mathcal{F}C(c)} X_{c,c',f'} = 0$ or $\Sigma_{c' \in \mathcal{F}C(c)} X_{c,c',f} = \Sigma_{c' \in \mathcal{F}C(c)} X_{c,c',f'} = 1$ In this case, $|\Sigma_{c' \in \mathcal{F}C(c)} X_{c,c',f} - \Sigma_{c' \in \mathcal{F}C(c)} X_{c,c',f'}| = 0$. At the same time, Eq. (2) becomes:

$Y_{c,f,f'} \leq 0$ $Y_{c,f,f'} \in \{0,1\}$, which indicates that $Y_{c, f, f'} = 0$. Therefore, $|\Sigma_{c' \in \mathcal{F}C(c)} X_{c,c',f} - \Sigma_{c' \in \mathcal{F}C(c)} X_{c,c',f'}| = Y_{c,f,f'}$.

Second, when $\Sigma_{c' \in \mathcal{F}C(c)} X_{c,c',f} \neq \Sigma_{c' \in \mathcal{F}C(c)} X_{c,c',f'}$, i.e., $\Sigma_{c' \in \mathcal{F}C(c)} X_{c,c',f} = 1$, $\Sigma_{c' \in \mathcal{F}C(c)} X_{c,c',f'} = 0$ or $\Sigma_{c' \in \mathcal{F}C(c)} X_{c,c',f} = 0$, $\Sigma_{c' \in \mathcal{F}C(c)} X_{c,c',f'} = 1$. In this case, $|\Sigma_{c' \in \mathcal{F}C(c)} X_{c,c',f} - \Sigma_{c' \in \mathcal{F}C(c)} X_{c,c',f'}| = 1$. At the same time, Eq. (2) becomes:

$Y_{c,f,f'} \leq 1$ $Y_{c,f,f'} \in \{0,1\}$

Because the negative of $Y_{c,f,f'}$ is being minimized, $Y_{c,f,f'} = 1$. Therefore, $|\Sigma_{c' \in \mathcal{F}C(c)} X_{c,c',f} - \Sigma_{c' \in \mathcal{F}C(c)} X_{c,c',f'}| = Y_{c,f,f'}$ still holds in this case.

With this linearization, the explicit integration optimization in Eq. (1) is rewritten as follows:

$$\min \sum_{f \in \mathcal{F}} \sum_{c \in d} \sum_{c' \in \mathcal{F}C(c)} dist(c, c') \cdot \xi_c \cdot X_{c,c',f} - \lambda \sum_{c \in d} \sum_{f \in \mathcal{F}} \sum_{f' \in \mathcal{F}} Y_{c,f,f'} \quad (4)$$

subject to (i) $\sum_{f \in \mathcal{F}} \sum_{c' \in \mathcal{F}C(c)} X_{c,c',f} \geq \mu, \forall c \in \mathcal{B}$ (ii) $\sum_{c \in d} \sum_{c' \in \mathcal{F}C(c)} X_{c,c',f} \geq N_l, \forall f \in \mathcal{F}$ (iii) $\sum_{c \in d} \sum_{c' \in \mathcal{F}C(c)} dist(c, c') X_{c,c',f} \geq T_f, \forall f \in \mathcal{F}$ (iv) $X_{c,c',f} = 0, \forall c \notin \mathcal{B}, \forall c' \in \mathcal{F}C(c), f \in \mathcal{F}$ (v) $X_{c,c',f} \in \{0, 1\}, \forall c \in d, c' \in \mathcal{F}C(c), f \in \mathcal{F}$ (vi) $\sum_{c' \in \mathcal{F}C(c)} X_{c,c',f} \leq 1, \forall c \in d, f \in \mathcal{F}$ (vii) $Y_{c,f,f'} \leq 2 - \sum_{c' \in \mathcal{F}C(c)} X_{c,c',f} - \sum_{c' \in \mathcal{F}C(c)} X_{c,c',f'}, \forall c \in d, f, f' \in \mathcal{F}$ (viii) $Y_{c,f,f'} \leq \sum_{c' \in \mathcal{F}C(c)} X_{c,c',f} - \sum_{c' \in \mathcal{F}C(c)} X_{c,c',f'}, \forall c \in d, f, f' \in \mathcal{F}$ (ix) $Y_{c,f,f'} \in \{0, 1\}, \forall c \in d, f, f' \in \mathcal{F}$ The second replacement method utilized by optimizer 205 is referred to herein as the "implicit joint concept replacement." Such a method is a variation of the integer linear program (ILP) solved by the first replacement method.

In the second replacement method, optimizer 205 implicitly determines which candidate $c' \in \mathcal{F}C(c)$ would be used to replace the selected concept c in the optimization procedure. In one embodiment, this is achieved by incorporating the effect of concept replacement using the average distance $\overline{dist}(c, \mathcal{F}C(c))$ as shown in the implicit integration optimization below.

$$\min \sum_{f \in \mathcal{F}} \sum_{c \in d} \overline{dist}(c, \mathcal{F}C(c)) \cdot \xi_c \cdot X_{c,f} - \lambda \sum_{c \in d} \sum_{f \in \mathcal{F}} \sum_{f' \in \mathcal{F}} |X_{c,f} - X_{c,f'}| \quad (5)$$

subject to (i) $\sum_{f \in \mathcal{F}} X_{c,f} \geq \mu, \forall c \in \mathcal{B}$ (ii) $\sum_{c \in d} X_{c,f} \geq N_l, \forall f \in \mathcal{F}$ (iii) $\sum_{c \in d} \overline{dist}(c, \mathcal{F}C(c)) X_{c,f} \geq T_f, \forall f \in \mathcal{F}$ (iv) $X_{c,f} = 0, \forall c \notin \mathcal{B}, \forall f \in \mathcal{F}$ (v) $X_{c,f} \in \{0, 1\}, \forall c \in d, f \in \mathcal{F}$ It is noted that there is an integer variable $X_{c,f} \in \{0, 1\}$ for every concept-fake file pair (c, f), where $X_{c,f}=1$ intuitively means that concept c E d will be replaced when generating the fake document $f \sqcup \mathcal{F}$.

As in the case of the explicit joint concept replacement method, the objective function in the implicit joint concept replacement has two parts. The first part uses $$\overline{dist}(c, \mathcal{F}C(c)) = \frac{\sum_{c' \in \mathcal{F}C(c)} dist(c, c')}{|\mathcal{F}C(c)|}$$

to denote the average distance between concept c and the feasible candidates in the set $\mathcal{F}$ C c). The objective function's first part sums up the products of the TFIDF $\tau_c$ of c and the average distances between concepts c selected for replacement and the average replacement distance to $\mathcal{F}$ C(c). Unlike the optimization problem used in the explicit joint concept replacement method (cf. Eq. (1)), the implicit joint concept replacement method implicitly encodes the concept replacement in the joint optimization problem. The second part is the same regularization term used in the explicit joint concept replacement method which ensures that different fake files have some diversity in the concepts replaced.

Constraints (i) to (v) have underlying intuitions that correspond precisely to those in Eq. (1) except that they are modified to use $X_{c,f}$ variables instead of $X_{c,c',f}$ variables which leads to a decrease in the number of variables. Suppose the total number of concepts in the concept importance bin B is M, the number of concepts in the feasible candidate replacement set $\mathcal{F}$ C(c) for each concept c=1, . . . , M is $n_c$, and the total number of fake documents $\mathcal{F}$ is F, then the total number of variables in the linearized versions of the explicit and implicit joint concept replacement methods are respectively $$\left(\sum_{c=1}^{M} n_c\right) * F + M * F^2 - O(M*N*F + M*F^2)$$

and $$M*F + M*F^2 - O(M*F^2).$$

where N=max $\{n_c | c \in B\}$ is the maximum number of feasible candidate replacement concepts for a single concept. Due to the term M*N*F, the number of variables in the explicit joint concept replacement method is larger than that of the implicit joint concept replacement method especially when N is large. Since the total number of constraints are linear with respect to the number of variables, the same result applies to the number of constraints.

In one embodiment, $\lambda$, $\mu$, $N_f$, $T_f$, and B are parameters that may be specified by the system security officer. In one embodiment, the implicit joint concept replacement method solves the optimization problem shown in Eq. (5) to identify which concepts c to replace. It then selects the replacement for c from the following distribution over $\mathcal{F}$ C(c):

$$p(c') = \frac{e^{dist(c,c')}}{\sum_{c'' \in \mathcal{F}C(c)} e^{dist(c,c'')}}.$$

It is noted that in the implicit joint concept replacement method, optimizer 205 selects concepts c in the optimization problem by minimizing the average distance between c and the feasible candidates in the objective function, so on average, the feasible candidates in $\mathcal{F}$ C(c) should not be too far away from c.

As in the case of the explicit joint concept replacement method, the optimization problem solved using the implicit joint concept replacement method is nonlinear. In order to develop a linear version of it, a set of binary auxiliary variables $Y_c$, f, f' is introduced, where for each c∈ d, f,f'∈ $\mathcal{F}$ :

$$Y_{c,f,f'} \leq 2 - X_{c,f} - X_{c,f'}$$

$$Y_{c,f,f'} \leq X_{c,f} + X_{c,f'}$$

$$Y_{c,f,f'} \in \{0,1\} \quad (6)$$

Now the new objection function becomes $$\min \sum_{f \in \mathcal{F}} \sum_{c \in d} \overline{dist}(c, \mathcal{F}C(c)) \cdot \xi_c \cdot X_{c,f} - \lambda \sum_{c \in d} \sum_{f \in \mathcal{F}} \sum_{f' \in \mathcal{F}} Y_{c,f,f'} \quad (7)$$

As in the case of the explicit joint concept replacement method, the following is the equivalent result:

Proposition 2. The objective function in Eq. (7) combined with Eq. (6) is equivalent to the objective function in Eq. (5). The proof is similar to the proof of Proposition 1 and, for the sake of brevity, will not be shown in detail herein. With the linearization, the implicit integration optimization of the implicit joint concept replacement method in Eq. (5) is re-written in the following form:

$$\min \sum_{f \in \mathcal{F}} \sum_{c \in d} \overline{dist}(c, \mathcal{F}C(c)) \cdot \xi_c \cdot X_{c,f} - \lambda \sum_{c \in d} \sum_{f \in \mathcal{F}} \sum_{f' \in \mathcal{F}} Y_{c,f,f'} \quad (8)$$

subject to (i) $\sum_{f \in \mathcal{F}} X_{c,f} \geq \mu, \forall c \in \mathcal{B}$ (ii) $\sum_{c \in d} X_{c,f} \geq N_l, \forall f \in \mathcal{F}$ (iii) $\sum_{c \in d} \overline{dist}(c, \mathcal{F}C(c)) X_{c,f} \geq T_f, \forall f \in \mathcal{F}$ (iv) $X_{c,f} = 0, \forall c \notin \mathcal{B}, \forall f \in \mathcal{F}$ (v) $X_{c,f} \in \{0, 1\}, \forall c \in d, f \in \mathcal{F}$ (vi) $Y_{c,f,f'} \leq 2 - X_{c,f} - X_{c,f'}, \forall c \in d, f, f' \in \mathcal{F}$ (vii) $Y_{c,f,f'} \leq X_{c,f} - X_{c,f'}, \forall c \in d, f, f' \in \mathcal{F}$ (viii) $Y_{c,f,f'} \in \{0, 1\}, \forall c \in d, f, f' \in \mathcal{F}$ The overall algorithm (algorithm 1) (referred to as "WE-FORGE") for generating a fake document by document generator 101 is shown below:

---

Algorithm 1: WE-FORGE

---

Input: Corpus , target document d, number of fake documents | |, parameters
   $\mu$, $\Lambda$, $N_f$, $T_f$,
Output: Set of fake documents
   1 Train word embeddings for the concepts c ∈ C;
   2 Compute $\xi_c$, C(c) for each c ∈ d;
   3 if Implicit Integration then
   4 | for c ∈ d do
   5 | |   Calculate $\overline{dist}$(c, C(c));
   6 | end
   7 | Compute $X_{c,f}$, $\forall_c$ ∈ d, f ∈ with Eq. (8);
   8 | for f ∈ do
   9 | |   Perform concept replacement according to $X_{c,f}$ from C(c) stochastically;
   10 | end
   11 end
   12 else
   13 | Compute $X_{c,c',f}$, $\forall_c$ ∈ d, c' ∈ C(c), f ∈ with Eq. (4);
   14 | for f ∈ do
   15 | |   Perform concept replacement according to $X_{c,c',f}$ deterministically;

Algorithm 1: WE-FORGE

16 | end
17 end
18 return Set of fake documents

The algorithm first computes word embeddings for each concept and then computes the TFIDF of each concept in the original document d, and sorts them into bins, and then computes the feasible candidate for each selected bin. Depending on whether document generator 101 uses the implicit or explicit joint concept replacement method, two different things are done.

If document generator 101 uses the implicit joint concept replacement method, then document generator 101 computes the average distance from c to the set of feasible replacement concepts for c. It is noted that this induces a probability distribution on the set of candidate replacements for c, i.e., the members of the cluster to which c belongs. This probability assigns to each c'∈Cluster(c) a probability:

$$Prob(c') = 1 - \frac{d(c, c')}{\sum_{c'' \in Cluster(c)} d(c, c'')}$$

Next, document generator 101 solves the linear version of the optimization problem to identify the concepts to replace in any given file. Document generator 101 then replaces the selected concepts in each file with a replacement chosen according to the distribution induced by the implicit joint concept replacement method. Because the replacement for a given concept in line 9 of the algorithm is chosen according to the distribution induced by the implicit joint concept replacement method, it is noted that this choice is stochastic and not deterministic.

If document generator 101 uses the explicit joint concept replacement method, then document generator 101 uses the ILP associated with the explicit joint concept replacement method to identify the (c, c', f) triples informing the user to replace concept c with c' in fake file f and then replace them directly.

As a result of the foregoing, embodiments of the present invention provide a means for improving the technology or technical field of cybersecurity systems by more effectively deterring intellectual property theft.

Furthermore, the present invention improves the technology or technical field involving cyber security systems. As discussed above, cybersecurity systems have been developed in an attempt to deter intellectual property theft. For example, one such system is referred to as the "FORGE" system. The FORGE system builds a multi-layer graph of the concepts in a real document and computes certain "meta-centrality" measures on the multi-layer graph to select concepts in the original document to replace. Once a concept is selected for replacement, the FORGE system requires an ontology pertinent to the domain of the documents in order to select a suitable replacement term. For example, if the fake documents are being developed by a company creating pacemakers for the heart, then the ontology may relate to biomedical heart devices.

However, the FORGE system requires good ontologies. That is, the FORGE system assumes that there is an ontology available for a given domain and that this ontology is appropriate for the domain in question. Though a number of ontologies do exist for various knowledge representation purposes, they do not exist for numerous domains, especially specialized domains. Moreover, they are financially expensive and time consuming to develop.

Furthermore, the FORGE system may not select the best concept-replacement pairs. The FORGE system first selects a set of concepts to replace in the original document d. For each selected concept, it then identifies a set of appropriate replacement concepts which it uses to generate the fake documents. However, this is suboptimal. For instance, a concept c in the original document may be an excellent one to replace in theory, but there may be no really good replacement terms for it. Because the concepts to replace are fixed without considering the availability and/or quality of the replacement, this can lead to suboptimal choices.

Additionally, in the FORGE system, the replacements chosen for a given concept may be deterministic. Replacing a concept c by the same replacement concept c' across multiple documents may make it easier for an adversary to detect the replacement concepts.

Furthermore, in the FORGE system, the set $\mathcal{F}$ of fake documents generated may be very similar. That is, the FORGE system does not ensure that there is diversity in the set of fake documents generated. For instance, if one wishes to generate 99 fake documents, it is possible that the FAKE system generates 99 fakes that all differ very minimally from each other because the set of (concept, replacement) pairs used to generate each fake document vary minimally.

As a result, current cybersecurity systems, such as the FORGE system, are deficient in the protection of data (e.g., electronic documents), such as deterring intellectual property theft.

Embodiments of the present invention improve such technology by building a corpus of domain specific documents. Word embeddings for each word in the documents are identified as embedding vectors. Concepts in the corpus of domain specific documents are then clustered together by clustering the embedding vectors. A feasible candidate replacement set is generated for each concept using the clustered concepts in the corpus of domain specific documents. After such pre-processing steps are accomplished, concepts are extracted from a document (a real document). The term frequency, inverse document frequency measurements are computed for these extracted concepts, in which the extracted concepts are clustered into bins based on such measurements. A joint optimization problem is solved to identify both the concepts in the document (real document) to be replaced using the clustered concepts in the bins as well as the corresponding replacement concepts obtained from the clustered concepts in the corpus of domain specific documents. Such a joint optimization problem may be solved using one of two methods discussed herein, namely, the explicit joint concept replacement method and the implicit joint concept replacement method. After solving such a joint optimization, the identified concepts in the document (real document) are replaced with the corresponding identified replacement concepts to generate a fake document. In this manner, embodiments of the present invention improve the protection of data, such as improving the deterrence of intellectual property theft. Hence, in this manner, there is an improvement in the technical field involving cybersecurity systems.

For example, embodiments of the present invention have many advantages over current cybersecurity systems, such as the FORGE system, in protecting theft of data, such as electronic documents. For example, embodiments of the present invention do not need an ontology. Furthermore, embodiments of the present invention select concept-replacement pairs rather than concepts first and then replacements, thus avoiding making a sub-optimal choice. Additionally, embodiments of the present invention ensure that the set of generated fake documents are diverse in the sense that there is a decent range of difference amongst them unlike FORGE. Furthermore, embodiments of the present invention ensure that replacements are chosen stochastically thus reducing the chances that an adversary can easily reverse engineer the replacements.

The technical solution provided by the present invention cannot be performed in the human mind or by a human using a pen and paper. That is, the technical solution provided by the present invention could not be accomplished in the human mind or by a human using a pen and paper in any reasonable amount of time and with any reasonable expectation of accuracy without the use of a computer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for generating fake documents, the method comprising:
   extracting concepts from a document;
   computing concept importance values for said extracted concepts;
   clustering said extracted concepts into bins according to said computed concept importance values;
   solving a joint optimization problem to identify both concepts in said document to be replaced using said clustered concepts in said bins as well as corresponding replacement concepts obtained from clustered concepts in a corpus of domain specific documents, wherein said concepts in said corpus of domain specific documents are clustered by clustering embeddings vectors, wherein word embeddings are identified for each word in documents of said corpus of domain specific documents as said embedding vectors; and
   replacing said identified concepts in said document with corresponding identified replacement concepts to generate a fake document.

2. The method as recited in claim 1, wherein a constraint in said optimization problem requires a sum of a distance between a concept and its replacement exceeding a threshold.

3. The method as recited in claim 1, wherein an objective function in said optimization problem minimizes a sum of term frequency, inverse document frequency values of selected concepts from a set of said bins.

4. The method as recited in claim 1, wherein an objective function in said optimization problem uses (c, f, f') triples to maximize a difference between whether concept c in said document is replaced in both fake files f, f'.

5. The method as recited in claim 1, wherein an objective function in said optimization problem uses an average distance between a concept and feasible candidates in a feasible candidate replacement set, wherein said feasible candidates comprise concepts from said clustered concepts in said corpus of domain specific documents.

6. The method as recited in claim 1, wherein an objective function in said optimization problem selects a concept to be replaced in said document by minimizing an average distance between said concept and feasible candidates in a feasible candidate replacement set, wherein said feasible candidates comprise concepts from said clustered concepts in said corpus of domain specific documents.

7. The method as recited in claim 1, wherein an objective function in said optimization problem identifies (c, c', f) triples to identify a concept c to be replaced with concept c' in fake file f using integer linear programming.

8. The method as recited in claim 1 further comprising:
   building said corpus of domain specific documents; and
   eliminating words from said domain specific documents from being replaced using a parts of speech tagging tool.

9. The method as recited in claim 8 further comprising:
   computing a concept importance value for a word representing a concept from said corpus of domain specific documents for each concept.

10. The method as recited in claim 1 further comprising:
    generating a feasible candidate replacement set for each concept using said clustered concepts in said corpus of domain specific documents.

11. A computer program product for generating fake documents, the computer program product comprising one or more computer readable storage mediums having program code embodied therewith, the program code comprising programming instructions for:
    extracting concepts from a document;
    computing concept importance values for said extracted concepts;
    clustering said extracted concepts into bins according to said computed concept importance values;
    solving a joint optimization problem to identify both concepts in said document to be replaced using said clustered concepts in said bins as well as corresponding replacement concepts obtained from clustered concepts in a corpus of domain specific documents, wherein said concepts in said corpus of domain specific documents are clustered by clustering embeddings vectors, wherein word embeddings are identified for each word in documents of said corpus of domain specific documents as said embedding vectors; and
    replacing said identified concepts in said document with corresponding identified replacement concepts to generate a fake document.

12. The computer program product as recited in claim 11, wherein a constraint in said optimization problem requires a sum of a distance between a concept and its replacement exceeding a threshold.

13. The computer program product as recited in claim 11, wherein an objective function in said optimization problem minimizes a sum of term frequency, inverse document frequency values of selected concepts from a set of said bins.

14. The computer program product as recited in claim 11, wherein an objective function in said optimization problem uses (c, f, f') triples to maximize a difference between whether concept c in said document is replaced in both fake files f, f'.

15. The computer program product as recited in claim 11, wherein an objective function in said optimization problem uses an average distance between a concept and feasible candidates in a feasible candidate replacement set, wherein said feasible candidates comprise concepts from said clustered concepts in said corpus of domain specific documents.

16. The computer program product as recited in claim 11, wherein an objective function in said optimization problem selects a concept to be replaced in said document by minimizing an average distance between said concept and feasible candidates in a feasible candidate replacement set, wherein said feasible candidates comprise concepts from said clustered concepts in said corpus of domain specific documents.

17. The computer program product as recited in claim 11, wherein an objective function in said optimization problem identifies (c, c', f) triples to identify a concept c to be replaced with concept c' in fake file f using integer linear programming.

18. The computer program product as recited in claim 11, wherein the program code further comprises the programming instructions for:
building said corpus of domain specific documents; and
eliminating words from said domain specific documents from being replaced using a parts of speech tagging tool.

19. The computer program product as recited in claim 18, wherein the program code further comprises the programming instructions for:
computing a concept importance value for a word representing a concept from said corpus of domain specific documents for each concept.

20. The computer program product as recited in claim 11, wherein the program code further comprises the programming instructions for:
generating a feasible candidate replacement set for each concept using said clustered concepts in said corpus of domain specific documents.

21. A system, comprising:
a memory for storing a computer program for generating fake documents; and
a processor connected to said memory, wherein said processor is configured to execute program instructions of the computer program comprising:
extracting concepts from a document;
computing concept importance values for said extracted concepts;
clustering said extracted concepts into bins according to said computed concept importance values;
solving a joint optimization problem to identify both concepts in said document to be replaced using said clustered concepts in said bins as well as corresponding replacement concepts obtained from clustered concepts in a corpus of domain specific documents, wherein said concepts in said corpus of domain specific documents are clustered by clustering embeddings vectors, wherein word embeddings are identified for each word in documents of said corpus of domain specific documents as said embedding vectors; and
replacing said identified concepts in said document with corresponding identified replacement concepts to generate a fake document.

22. The system as recited in claim 21, wherein a constraint in said optimization problem requires a sum of a distance between a concept and its replacement exceeding a threshold.

23. The system as recited in claim 21, wherein an objective function in said optimization problem minimizes a sum of term frequency, inverse document frequency values of selected concepts from a set of said bins.

24. The system as recited in claim 21, wherein an objective function in said optimization problem uses (c, f, f') triples to maximize a difference between whether concept c in said document is replaced in both fake files f, f'.

25. The system as recited in claim 21, wherein an objective function in said optimization problem uses an average distance between a concept and feasible candidates in a feasible candidate replacement set, wherein said feasible candidates comprise concepts from said clustered concepts in said corpus of domain specific documents.

26. The system as recited in claim 21, wherein an objective function in said optimization problem selects a concept to be replaced in said document by minimizing an average distance between said concept and feasible candidates in a feasible candidate replacement set, wherein said feasible candidates comprise concepts from said clustered concepts in said corpus of domain specific documents.

27. The system as recited in claim 21, wherein an objective function in said optimization problem identifies (c, c', f) triples to identify a concept c to be replaced with concept c' in fake file f using integer linear programming.

28. The system as recited in claim 21, wherein the program instructions of the computer program further comprise:
building said corpus of domain specific documents; and
eliminating words from said domain specific documents from being replaced using a parts of speech tagging tool.

29. The system as recited in claim 28, wherein the program instructions of the computer program further comprise:
computing a concept importance value for a word representing a concept from said corpus of domain specific documents for each concept.

30. The system as recited in claim 21, wherein the program instructions of the computer program further comprise:
generating a feasible candidate replacement set for each concept using said clustered concepts in said corpus of domain specific documents.

* * * * *